(12) United States Patent
Wu et al.

(10) Patent No.: US 8,238,642 B2
(45) Date of Patent: *Aug. 7, 2012

(54) METHODS AND APPARATUS FOR MEASURING 3D DIMENSIONS ON 2D IMAGES

(75) Inventors: Yanyan Wu, Schenectady, NY (US); Donald Robert Howard, Troy, NY (US); Harry Israel Ringermacher, Delanson, NY (US); Robert August Kaucic, Niskayuna, NY (US); Zhaohui Sun, Niskayuna, NY (US); Francis Howard Little, Cincinnati, OH (US); Xiaodong Tao, Niskayuna, NY (US); Patrick Joseph Howard, Cincinnati, OH (US); Matthew Edward Dragovich, West Chester, OH (US); Eric Scott Foster, Cincinnati, OH (US)

(73) Assignee: General Electric Company, Niskayuna, NY (US)

( * ) Notice: Subject to any disclaimer, the term of this patent is extended or adjusted under 35 U.S.C. 154(b) by 930 days.

This patent is subject to a terminal disclaimer.

(21) Appl. No.: 12/274,687

(22) Filed: Nov. 20, 2008

(65) Prior Publication Data
US 2010/0124369 A1    May 20, 2010

(51) Int. Cl.
*G06K 9/00* (2006.01)
*G06K 9/20* (2006.01)
(52) U.S. Cl. ......................... 382/141; 382/154; 382/285
(58) Field of Classification Search .......... 382/141–152, 382/154, 285, 305; 345/419–427, 700; 348/42–60, 348/850; 356/12–14
See application file for complete search history.

(56) References Cited

U.S. PATENT DOCUMENTS

| 6,206,566 | B1  |   3/2001 | Schuetz |             |
|-----------|-----|----------|---------|-------------|
| 6,434,278 | B1* |   8/2002 | Hashimoto | ............ 382/285 |
| 6,980,685 | B2* |  12/2005 | Tyan et al. | ............ 382/141 |
| 7,079,132 | B2  |   7/2006 | Sauer et al. |           |
| 7,197,193 | B2  |   3/2007 | Li et al. |            |
| 7,336,814 | B2* |   2/2008 | Boca et al. | ............ 382/141 |
| 7,365,862 | B2* |   4/2008 | Hu et al. | ............ 356/601 |
| 7,415,152 | B2  |   8/2008 | Jiang et al. |           |

(Continued)

OTHER PUBLICATIONS

F. Lapierre, R. Dumont, A. Borghgraef, J-P Marcel, and M.Acheroy, "OSMOSIS: An Open-source Software for Modelling of Ship Infrared Signatures", in 3rd International IR Target, Background Modelling & Simulation (ITBMS) Workshop, Toulouse, France, (2007).*

(Continued)

*Primary Examiner* — Andrae S Allison
(74) *Attorney, Agent, or Firm* — Penny A. Clarke

(57) ABSTRACT

A method for determining 3D distances on a 2D pixelized image of a part or object includes acquiring a real 2D pixelized image of the object, creating a simulated image of the object using the 3D CAD model and the 2D pixelized image, determining a specified cost function comparing the simulated image with the real 2D pixilated image and repositioning the simulated image in accordance with iterated adjustments of a relative position between the CAD model and the 2D pixilated image to change the simulated image until the specified cost function is below a specified value. Then, the workstation is used to generate a 3D distance scale matrix using the repositioned simulated image, and to measure and display distances between selected pixels on a surface of the real image using 2D distances on the 2D pixelized image of the object and the 3D distance scale matrix.

20 Claims, 5 Drawing Sheets

U.S. PATENT DOCUMENTS

| | | |
|---|---|---|
| 7,477,360 B2 | 1/2009 | England et al. |
| 7,508,977 B2 * | 3/2009 | Lyons et al. ................. 382/154 |
| 7,869,899 B2 * | 1/2011 | Hammond et al. ........... 700/194 |
| 2004/0247174 A1 * | 12/2004 | Lyons et al. ................. 382/154 |
| 2005/0169512 A1 * | 8/2005 | Fang et al. ................... 382/141 |
| 2007/0065002 A1 | 3/2007 | Marzell et al. |
| 2007/0217672 A1 | 9/2007 | Shannon et al. |

OTHER PUBLICATIONS

P. Wunsch and G. Hirzinger, "Registration of CAD-Models to Images by Iterative Inverse Perspective Matching," Proc. 13th Int'l Conf. Pattern Recognition, vol. 1, pp. 78-83, Aug. 1996.*

* cited by examiner

METHODS AND APPARATUS FOR MEASURING 3D DIMENSIONS ON 2D IMAGES

BACKGROUND OF THE INVENTION

The field of the invention relates generally to methods and apparatus for measuring 3 dimensions (3D) on 2 dimensional (2D) images, and more particularly to methods and apparatus to conduct adaptive inspection for obtaining data that may include information in external and/or internal dimensions, surface condition information, and/or internal defect information.

Many components must be manufactured or maintained without surface or interior flaws. CMC (ceramic matrix composite) material is often used in fabricating aircraft components and other types of components. Sometimes, these components have, or develop, surface and/or interior flaws. Inspection for such flaws may be performed using known Infrared (IR) inspection systems in which an IR camera is used to provide 2D thickness images, along projection directions. The size of each defect is measured on a 2D IR image, which provides only information on the plane orthogonal to the direction of projection of the IR system. In addition, diffusivity information, which cannot be derived solely from 2D IR images, cannot be used to help characterize defect types on IR images. Also, as a result of optimization for their various applications, CMC components often have complex shapes and surfaces. Thus it may be difficult to measure a defect in three dimensions (3D) directly from an IR image.

Known methods for linking IR to CAD data have relied upon attaching a fixture to the part during inspection, as described in, for example, "[a] novel method for internal feature reconstruction based on Infrared thickness measurement" at the Third International Symposium on Multispectral Image Processing and Pattern Recognition, Proceedings of the SPIE, Volume 5286, pp. 230-237 (2003). Known methods for unrolling UT (ultrasonic tomographic) images use a mesh model rather than a solid CAD model. For example, U.S. Patent Application No. US20070217672A1 to Shaimon et al., entitled "Combined 2D and 3D nondestructive examination" discloses a technique of using 3D information as a visual aid for NDE (non-destructive examination) inspection. However, Shannon et al. does not describe nor suggest a specific method of unrolling IR images using 3D information. Rather, the methods disclosed therein are used to map 2D image onto 3D geometry, rather than mapping 3D information onto a 2D image.

A need thus exists for a device that can conveniently measure such defects in 3D directly from an acquired image. A need also exists for an inspection system in which acquired images and CAD data are linked to allow diffusivity compensation to improve inspection accuracy and/or to characterize defect types.

BRIEF DESCRIPTION OF THE INVENTION

In one aspect, a method for determining 3D distances on a 2D pixelized image of a part or object is provided. The method includes acquiring a real 2D pixelized image of the object using the camera and operating the workstation to create a simulated image of the object using the 3D CAD model and the 2D pixelized image. The method further includes using the workstation to determine a specified cost function comparing the simulated image with the real 2D pixilated image and repositioning the simulated image in accordance with interated adjustments of a relative position between the CAD model and the 2D pixilated image to change the simulated image until the specified cost function is below a specified value. Once below the specified value, the method further includes using the workstation to generate a 3D distance scale matrix using the repositioned simulated image, and using the workstation to measure and display distances between selected pixels on a surface of the real image using 2D distances on the 2D pixelized image of the object and the 3D distance scale matrix.

In another aspect, there is provided an apparatus for determining 3D distances on a 2D pixelized image of a part or object. The apparatus comprises a camera, a computer workstation configured to receive images from the camera and having a 3D CAD model of the object, and a display. The apparatus is configured to acquire a real 2D pixelized image of the object, create a simulated image of the object using the 3D CAD model, and determine a specified cost function comparing the simulated image with the real 2D pixilated image. The apparatus is further configured to reposition the simulated image in accordance with interated adjustments of a relative position between the CAD model and the 2D pixilated image to change the simulated image until the specified cost function is below a specified value, generate a 3D distance scale matrix using the repositioned simulated image, and measure and display distances between selected pixels on a surface of the real image using 2D distances on the pixelized image of the object and the 3D distance scale matrix.

In yet another aspect, there is provided a machine-readable medium or media having recorded thereon instructions configured to instruct a computer workstation in an apparatus comprising a camera, a computer workstation configured to receive images from said camera and having a 3D CAD model of an object, and a display, to acquire a real 2D pixelized image of the object using the camera and to create a simulated image of the object using the 3D CAD model. The instructions are further configured to instruct the computer workstation to determine a specified cost function comparing the simulated image with the real 2D pixilated image, reposition the simulated image in accordance with interated adjustments of a relative position between the CAD model and the 2D pixilated image to change the simulated image until the specified cost function is below a specified value, generate a 3D distance scale matrix using the repositioned simulated image, and measure and display distances between selected pixels on a surface of the real image using 2D distances on the pixelized image of the object and the 3D distance scale matrix.

DETAILED DESCRIPTION OF THE INVENTION

A technical effect of some embodiments of the present invention is to link a real inspection image with a simulated CAD (computer aided design) model and to display dimensional information that otherwise would not be available. This linking can be used, for example, to enable 3D measurements of defects from 2D images and diffusivity compensation for IR inspection.

Figure 1:
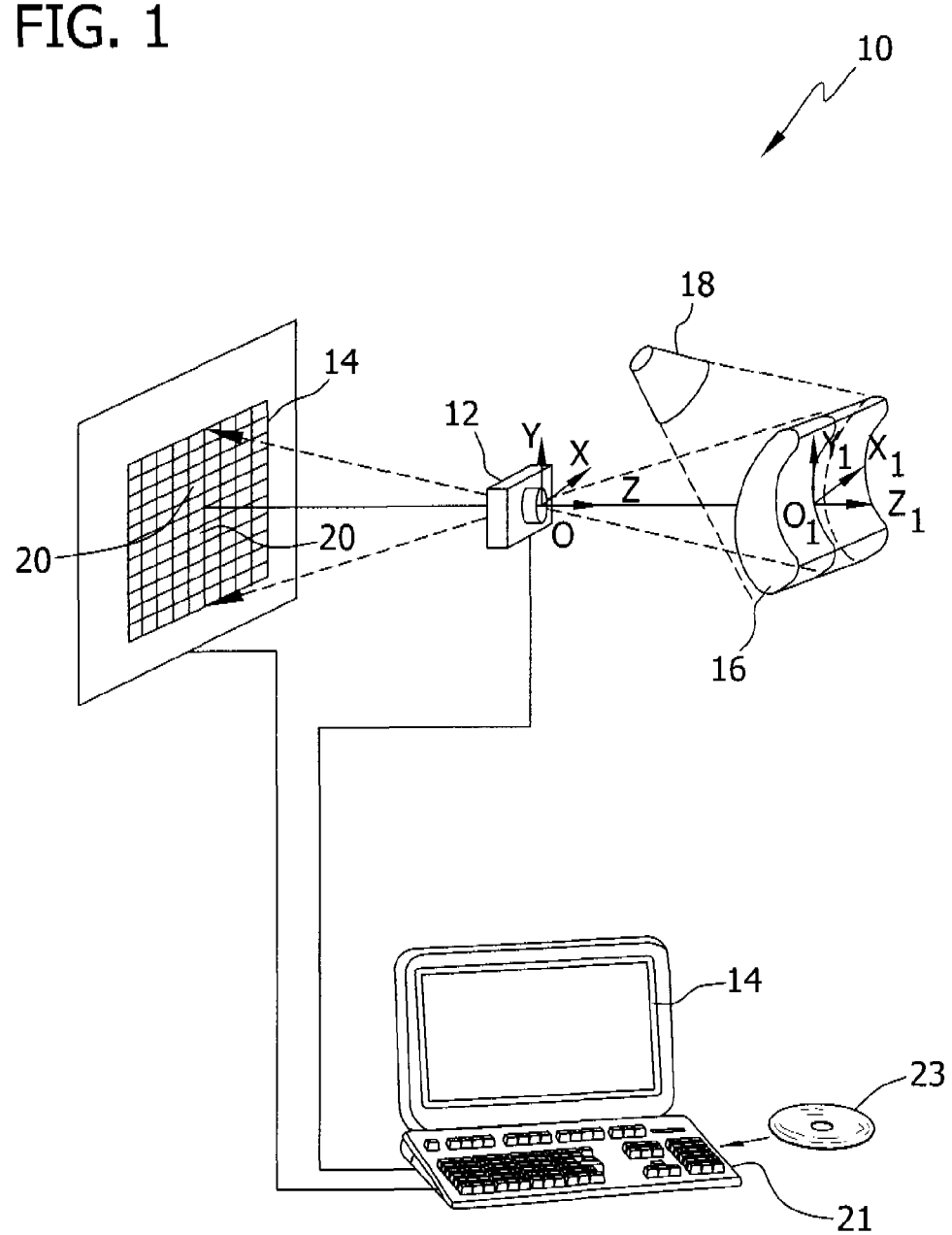
FIG. 1 is a pictorial block diagram of an exemplary apparatus for use in determining 3D distances from a 2D image of an object.

FIG. 1 is a pictorial block diagram of an exemplary apparatus 10 for use in determining 3D distances from a 2D image of an object. In the exemplary exhibit, apparatus (10) includes an IR camera 12 that scans or otherwise produces IR (thermal) images 14 of a part 16 under inspection. One or more IR lamps 18 are used to initially heat part 16 before being de-energized. In some embodiments, lamps 18 are only energized for several seconds to heat part 16. The acquision of a first thermal image 14 occurs after lamp 18 is de-energized. In some embodiments 10, thermal images 14 can be rapidly and repeatedly acquired as the temperature of part 16 diminishes. For example, images 14 may be acquired up to one hundred times per second, at every microsecond, at every several microseconds, or at any other rate, depending upon the thickness of part 16 and the speed of its cool down. Each image 14 acquired in such a manner is different, in that the temperature varies somewhat from image to image. Although images 14 are related to what is shown in FIG. 1 as a "film plane," those of ordinary skill in the art will recognize that this "film plane" in most embodiments represents an array of IR sensors.

Images 14 are processed to determine a thickness of part 16 at various points 20 on the image. The thickness is readily determined when part 16 has a uniform composition because in such embodiments, areas of greater thickness will have a greater heat capacity and will thus cool down more slowly. The thicknesses of parts with known, non-uniform compositions, such as those parts that include coatings or laminations, can also be determined using a more detailed application of this principle. The processing required for those determinations, as well as control of apparatus 10, input of camera IR image 14, and processing of a CAD image can be performed in a computer workstation 21 under control of a program which can be in internal storage of workstation 21 or on a machine readable medium 23 or media of any suitable type, such as a CD-ROM.

Figure 2:
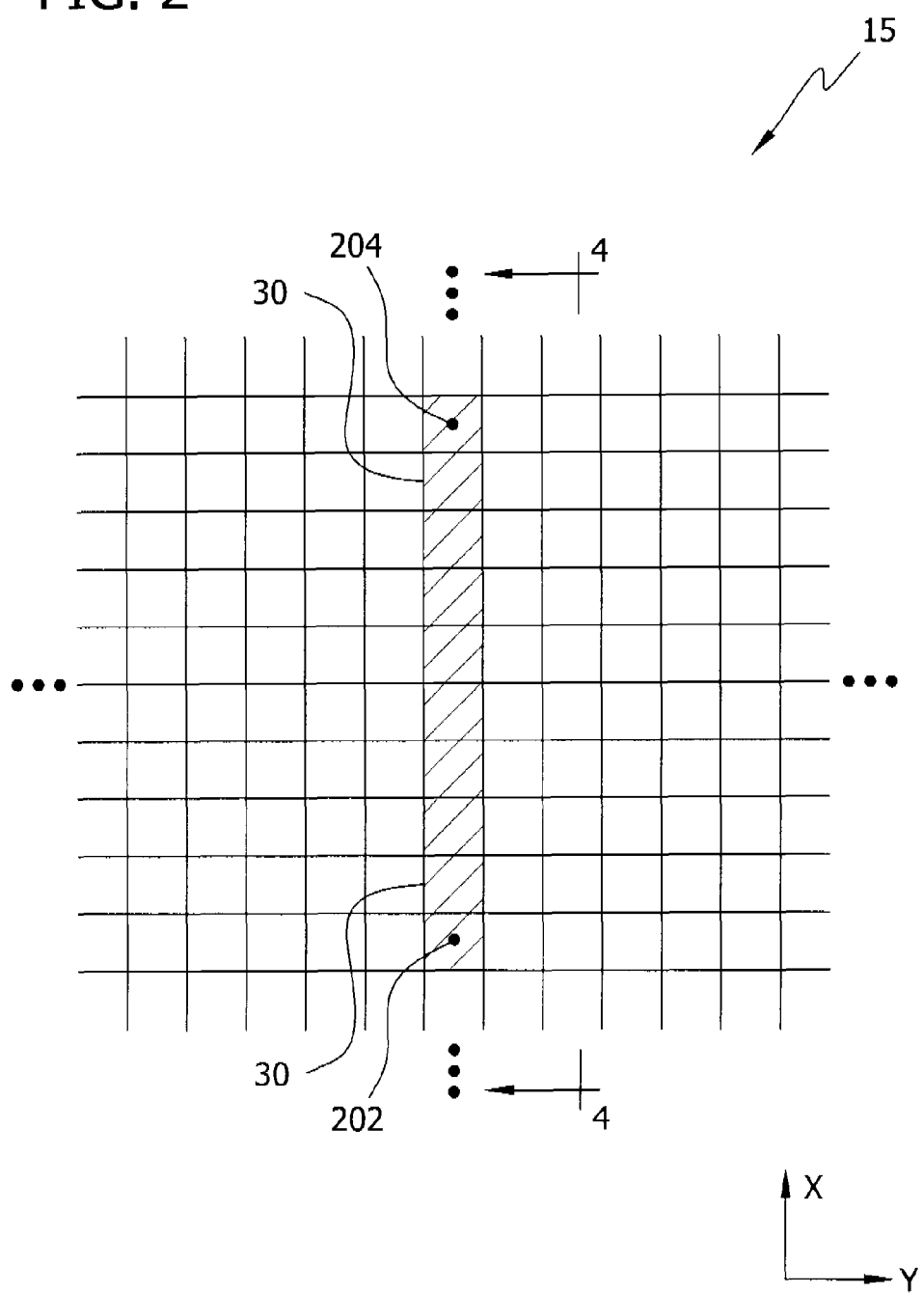
FIG. 2 is a representation of a portion of a pixelized image obtained from the apparatus shown in FIG. 1, wherein the image includes a fault or defect present in an object.

In some embodiments and referring to FIG. 2, a defect may be found on some portion 15 of a pixilated image 14. More specifically, FIG. 2 illustrates a representation of a portion of a pixelized image obtained from the apparatus shown in FIG. 1, wherein the image includes a fault or defect present in an object. A defect, such as a crack, may manifest itself as, for example, a dark line or curve 30, because the portion of part 16 in the immediate vicinity of the crack is thinner and hence cools more rapidly than other portions of part 16 that do not include defects. In some instances, depending on the orientation of part 16 relative to the "film plane," the crack may be projected on image 14 as a straight line 30 rather than as a curve, even though the portion of part 16 that is cracked is actually curved. Linking the IR thermal image 14 to the 3D geometry of part 16, enables the actual 3D dimensions of the crack or other defect on part 16 to be determined and enables a determination of whether the defect is curved, and if so, whether it is an arc or a spline, etc.

Figure 3:
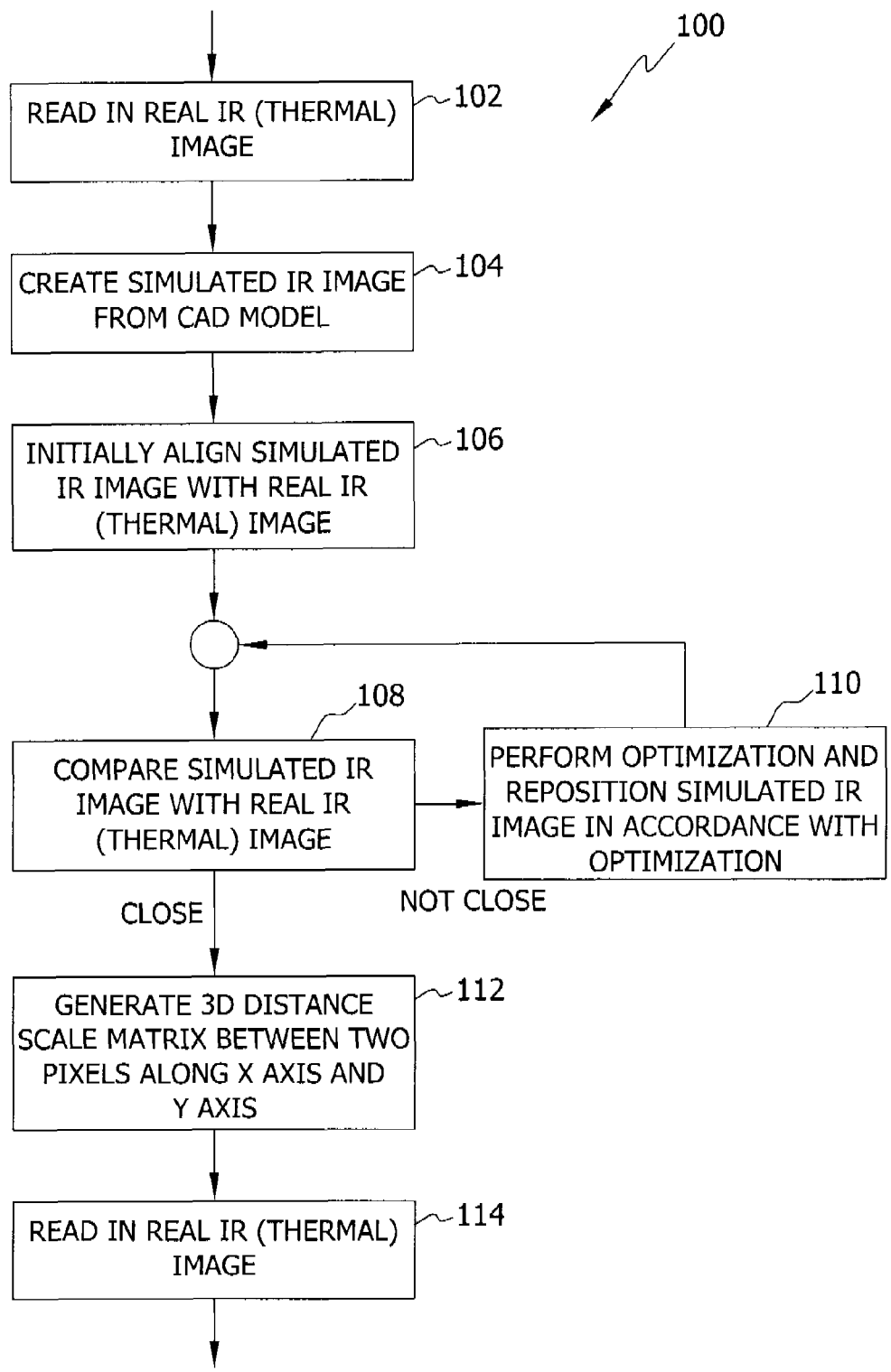
FIG. 3 is a flowchart of a portion of an exemplary process performed by the apparatus shown in FIG. 1.

FIG. 3 is a flowchart of a portion of an exemplary process performed by the apparatus shown in FIG. 1. In flow chart 100, 3D distances are determined between pairs of pixels. At block 102, the real 2D pixilated IR (thermal) image 14 is read in, as well as a view angle and distance for the real IR image. (The view angle can be determined based on the relative orientations of IR camera 12 and part 16, and may itself be relative to a standard position.) At block 104, a simulated IR image is generated from a CAD model of part 16 in accordance with the view angle of the real 2D pixilated IR image 14 and based on the temperature to which part 16 is heated. The simulated IR image may be generated by a computer projecting the CAD model through a simulated IR camera at the view angle and distance of the real part 16 from real camera 12. In many embodiments, block 106 is subsumed by the making of this computer projection. In other embodiments, an additional adjustment may be made at block 106. The adjustment at block 106 may be made either manually, e.g., by visual inspection of images on a screen followed by a manual adjustment, automatically by a program in a computer or workstation, or by some combination thereof.

Next, at block 108, a suitable cost function is used to compare the simulated IR image with the real 2D pixilated IR (thermal) image 14. The cost function can be evaluated by establishing a correspondence between pixels on the 2D pixilated IR image 14 with points on the 3D CAD model. On suitable cost function is related to a grayscale difference between the two images. For example, an embodiment may have pixels that are assigned grayscale values between 0 and 255 depending upon real or simulated IR emission intensity or interpreted thickness value. Such an embodiment may also have an image size of, for example, 500×500 pixels. An example of a cost function suitable for this embodiment is one in which a statistic is calculated that depends upon the difference of grayscale values of corresponding pixels in the real 2D pixilated IR (thermal) image 14 and the simulated IR image. The statistic may be, for example, the sum of the absolute values of the differences in grayscale values.

If, at block 108, the value of the cost function is at or above a selected threshold value, a suitable optimization is performed 110 to determine a repositioning of the simulated IR image (i.e., an adjustment of a relative position between the CAD model and the 2D pixilated image to change the IR image), and the simulated IR image is repositioned in accordance with this determination. One suitable optimization method utilizes an LM (Levenberg-Marquardt) algorithm, which provides a numerical solution to the problem of minimizing a function, generally non-linear, over a space of parameters of the function. The algorithm interpolates between the Gauss-Newton method and the method of gradient descent. However, any other optimization method that works can be employed in other embodiments. For example, a Newton algorithm can be used, but the Newton algorithm does not necessarily guarantee a group or optimization solution.

If an optimization is necessary, it is performed and the comparison at block 108 is performed again. The loop comprising blocks 108 and 110 is performed until the cost function is below the selected threshold value. When this occurs, or if no optimization is necessary, a 3D distance scale matrix between two pixels along the x-axis and the y-axis is generated at block 112 in accordance with the simulated and optimized IR image and the CAD model used to produce the simulated and optimized IR image. More particularly, in an embodiment having a thermal image 14 of 500 by 500 pixels, it is assumed that the pixels are linearly spaced in the x and y direction, e.g., that the pixels represent 100 mm×100 mm portions of part 16. (Some, but not all embodiments, apply a correction to image 14 based on the view angle projection for each pixel to compensate for pincushion, barrel, or other known types of distortion in image 14.) In this embodiment, the 3D distance scale matrix comprises a value for each pixel (x,y) that represents the distance (depth) of the surface of the CAD model simulated pixel relative to a distance to an imputed 2D surface representing thermal image 14. It is thus possible to determine a distance along the surface of a part 16 using the matrix values contained in the 3D distance scale matrix as offsets from a fat surface. At block 114, assuming that neither IR camera 12 nor part 16 are moved or otherwise adjusted, additional thermal images 14 can be read repeatedly (e.g., acquired every several microseconds, or as otherwise discussed above) and analyzed for defects and such defects measured using the same 3D distance scale matrix generated in block 112.

Figure 4:
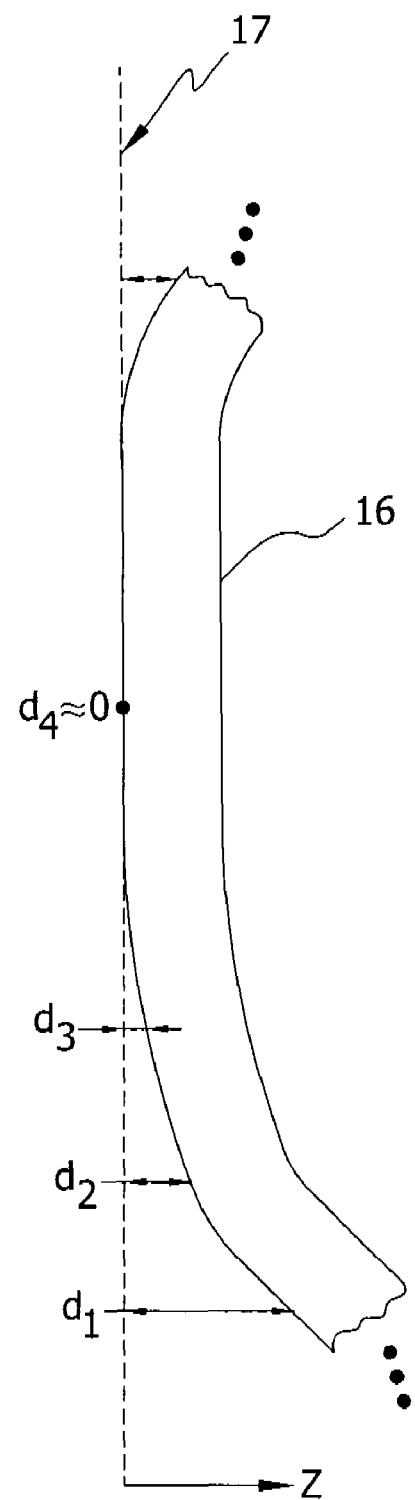
FIG. 4 is a side cut-away view of an exemplary CAD image of a part represented by the 2D image shown in FIG. 2 and taken along line 4-4 in FIG. 2.
Figure 5:
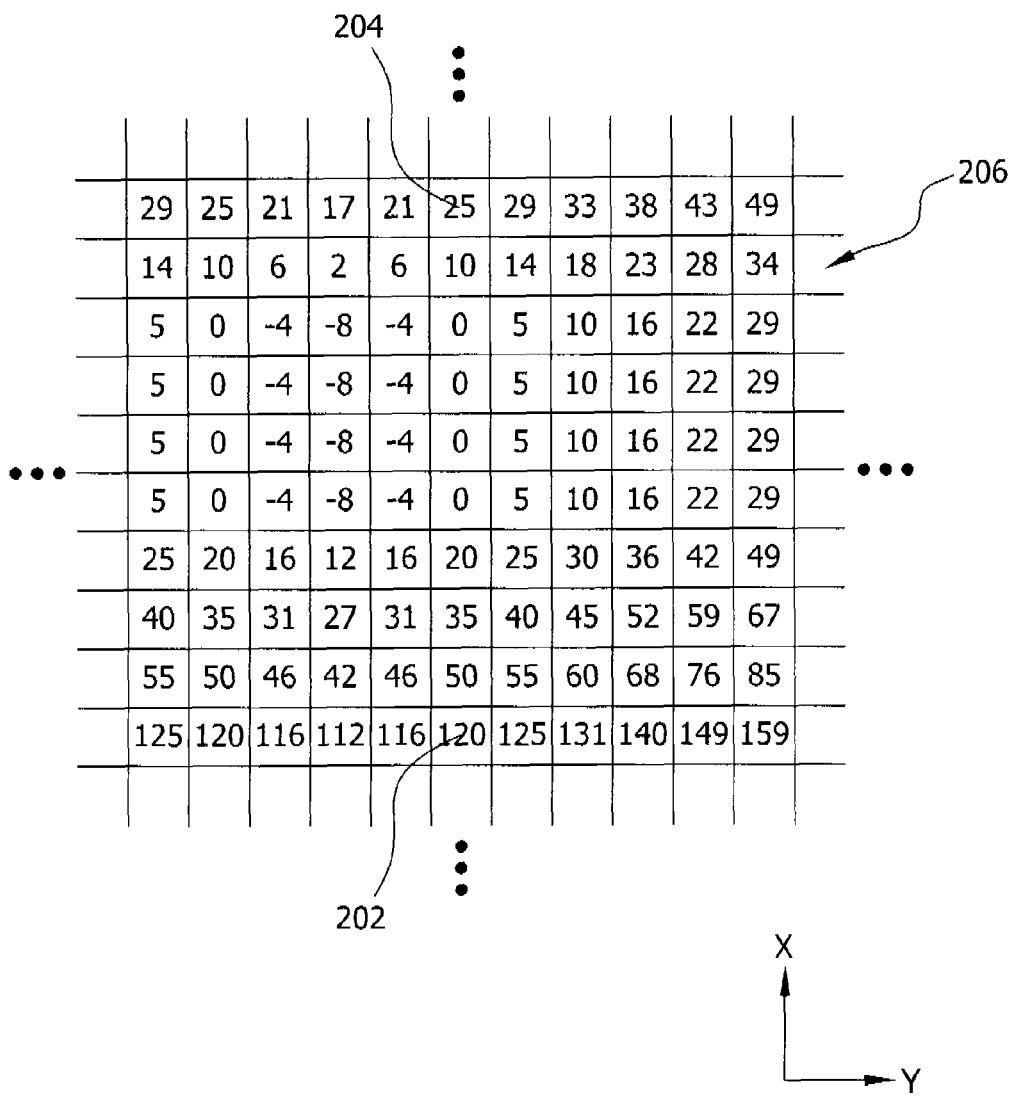
FIG. 5 is a portion of a 3D distance scale matrix containing Z-axis distances determined using an unrolled CAD model and the distance of its surface from pixels in a focal plane.

For example and referring to FIG. 2 and FIG. 4 (the latter figure being a cross section along line 4-4 of a part 16 depicted in FIG. 2), a crack manifesting itself as line 30 in portion 15 of FIG. 4 includes pixels representing portions of part 16 that are not coincident with focal plane 17 of camera 12. Examples of such distances in the z-direction relative to focal plane 17 are shown in FIG. 4 as $d_1$, $d_2$, $d_3$, $d_4$, and $d_5$, with $d_4 \approx 0$. Therefore, if a straight crack extends, for example, from pixel 202 to pixel 204 as shown in FIG. 2, the distance determined solely by the x-y coordinates of pixels 202 and 204 does not give an accurate representation of the length or geometry of the crack because it such a distance ignores the z-axis distance of the projection of the crack onto line 30. Referring to FIG. 5, a portion of the 3D distance scale matrix 206 containing z-axis distances of the unrolled CAD model from focal plane 17 is shown. The numbers contained in the matrix each represent the z-axis distance representative of the corresponding pixel in image 14. Thus, a good approximation to the real distance represented by any specific pixels on image 14 along the surface of a part 16 is readily determined using x-y coordinates and z-axis distances in the 3D distance scale matrix 206 corresponding to selected x-y coordinates. For example, the distance along a curved portion of the surface of part 16 represented by a line between pixels 202 and 204 can be determined by obtaining the geodesic distance between two points in the 3D image corresponding to the adjacent pixels along the length of the line. If the curve is known from the CAD model to follow a specific parametric curve, an even better, non-linear estimate can be obtained.

The unrolling of the CAD model and the IR (thermal) image thus allows a workstation to use CAD information to improve inspection accuracy, such as thermal diffusivity correction for IR inspection. The CAD information can also be used to obtain accurate inspection analysis on a 2D inspection images (such as defect sizing on an IR image). Furthermore, IR inspection data can be visualized and/or analyzed on the 3D geometry of the CAD model and the inspection directly validated based upon engineering specifications of the CAD model. Some configurations can be extended by incorporating X-ray CT (computed tomographic) information with the CAD model to link the IR (thermal) image to the more accurate 3D geometry information from the CAD model and CT X-ray inspection data.

In place of a 2D pixilated IR (thermal) image, some embodiments utilize a UT (ultrasound tomographic) image. Other types of real 2D images may be used along with the 3D CAD model. Linking 2D images with 3D CAD models enables 3D world measurements of defects on 2D IR images. One embodiment enables measurements of CMC composite blades, vanes, and shrouds used in aircraft. CAD information can also be used in some embodiments for diffusivity compensation, for better defect characterization and for more accurate defect sizing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method for determining 3D distances on a 2D pixelized image of a part or object using a camera, a 3D CAD model of the object, and a workstation that includes a display, said method comprising:
   acquiring a real 2D pixelized image of the object, using the camera;
   operating the workstation to create a simulated image of the object using the 3D CAD model and the 2D pixelized image;
   use the workstation to determine a specified cost function comparing the simulated image with the real 2D pixilated image;
   repositioning the simulated image in accordance with interated adjustments of a relative position between the CAD model and the 2D pixilated image to change the simulated image until the specified cost function is below a specified value;
   once below the specified value, using the workstation to generate a 3D distance scale matrix using the repositioned simulated image; and
   using the workstation to measure and display distances between selected pixels on a surface of the real image using 2D distances on the 2D pixelized image of the object and the 3D distance scale matrix.

2. A method in accordance with claim 1 wherein acquiring the real 2D pixelized image comprises acquiring a real IR (thermal) image.

3. A method in accordance with claim 2 used for nondestructive inspection of CMC parts.

4. A method in accordance with claim 2 used for nondestructive inspection of CMC aircraft parts.

5. A method in accordance with claim 1 wherein said iterative adjustments use a statistic that depends upon a difference of grayscale values of corresponding pixels in the real image and the simulated image.

6. A method in accordance with claim 1 wherein performing said iterative adjustments comprises using an LM optimization method.

7. A method in accordance with claim 1 wherein performing said iterative adjustments comprises using a Newton algorithm.

8. A method in accordance with claim 1 wherein once below the specified value, generating a 3D distance scale matrix using the repositioned simulated image further comprises determining distances of the simulated image from a focal plane.

9. A method in accordance with claim 8 wherein said measuring and displaying distances between selected pixels on a surface of the real image using 2D distances on the pixelized image of the object comprises using geodesic distances treated as x-y coordinates and thickness data treated as z-axis distances in the 3D distance scale matrix corresponding to selected x-y coordinates to determine said distances between selected pixels on the surface of the real image.

10. An apparatus for determining 3D distances on a 2D pixelized image of a part or object, said apparatus comprising:
   a camera;
   a computer workstation configured to receive images from said camera and having a 3D CAD model of the object; and
   a display;

said apparatus configured to:
acquire a real 2D pixelized image of the object;
create a simulated image of the object using the 3D CAD model;
determine a specified cost function comparing the simulated image with the real 2D pixilated image;
reposition the simulated image in accordance with interated adjustments of a relative position between the CAD model and the 2D pixilated image to change the simulated image until the specified cost function is below a specified value;
generate a 3D distance scale matrix using the repositioned simulated image; and
measure and display distances between selected pixels on a surface of the real image using 2D distances on the pixelized image of the object and the 3D distance scale matrix.

11. An apparatus in accordance with claim 10 wherein the camera is an IR camera and to acquire the real 2D pixelized image, said apparatus configured to acquire a real IR (thermal) image.

12. An apparatus in accordance with claim 10 wherein said iterative adjustments use a statistic that depends upon a difference of grayscale values of corresponding pixels in the real image and the simulated image.

13. An apparatus in accordance with claim 10 wherein to perform said iterative adjustments, said apparatus configured to use an LM optimization method.

14. An apparatus in accordance with claim 10 wherein to generate a 3D distance scale matrix using the repositioned simulated image, said apparatus configured to determine distances of the simulated image from a focal plane.

15. An apparatus in accordance with claim 14 wherein to measure and display distances between selected pixels on a surface of the real image using 2D distances on the pixelized image of the object and the 3D distance scale, said apparatus configured to use geodesic distances treated as x-y coordinates and thickness data treated as z-axis distances in the 3D distance scale matrix corresponding to selected x-y coordinates to determine said distances between selected pixels on the surface of the real image.

16. A nontransitory computer readable storage medium or media having recorded thereon computer instructions configured to instruct a computer workstation in an apparatus comprising a camera, a computer workstation configured to receive images from said camera and having a 3D CAD model of an object, and a display, to:
acquire a real 2D pixelized image of the object using the camera;
create a simulated image of the object using the 3D CAD model;
determine a specified cost function comparing the simulated image with the real 2D pixilated image;
reposition the simulated image in accordance with interated adjustments of a relative position between the CAD model and the 2D pixilated image to change the simulated image until the specified cost function is below a specified value;
generate a 3D distance scale matrix using the repositioned simulated image; and
measure and display distances between selected pixels on a surface of the real image using 2D distances on the pixelized image of the object and the 3D distance scale matrix.

17. A nontransitory computer readable storage media or medium in accordance with claim 16 wherein the camera is an IR camera and said media or medium further have recorded instructions configured to instruct the workstation to acquire a real IR (thermal) image.

18. A nontransitory computer readable storage media or medium in accordance with claim 16 wherein to iteratively change the alignment of the simulated image with the real image until a specified cost function is below a specified value, said recorded instructions further configured to instruct the workstation to use a statistic that depends upon a difference of grayscale values of, or thickness information associated with corresponding pixels in the real image and the simulated image.

19. A nontransitory computer readable storage media or medium in accordance with claim 16 wherein to perform said iterative adjustments, said recorded instructions further configured to instruct the workstation to use an LM optimization method.

20. A nontransitory computer readable storage media or medium in accordance with claim 19 wherein to generate a 3D distance scale matrix using the repositioned simulated image, said recorded instructions further configured to determine distances of the repositioned simulated image from a focal plane, and wherein to measure and display distances between selected pixels on a surface of the real image using 2D distances on the pixelized image of the object and the 3D distance scale, said recorded instructions further configured to use geodesic distance treated as x-y coordinates and thickness data treated as z-axis distances in the 3D distance scale matrix corresponding to selected x-y coordinates to determine said distances between selected pixels on the surface of the real image.

* * * * *